United States Patent [19]

Taguchi et al.

[11] Patent Number: 6,163,532
[45] Date of Patent: Dec. 19, 2000

[54] PACKET DATA TRANSFERRING METHOD FOR MOBILE RADIO DATA COMMUNICATION SYSTEM

[75] Inventors: Tsutomu Taguchi; Shinji Kobayashi; Yoshiki Fujima; Kazushige Tanaka, all of Yokohama; Masahiko Hirono, Yokosuka, all of Japan

[73] Assignee: NTT Mobile Communications Networks, Inc., Tokyo, Japan

[21] Appl. No.: 08/894,542

[22] PCT Filed: Mar. 5, 1997

[86] PCT No.: PCT/JP97/00676

§ 371 Date: Aug. 21, 1997

§ 102(e) Date: Aug. 21, 1997

[87] PCT Pub. No.: WO97/33444

PCT Pub. Date: Sep. 12, 1997

[30] Foreign Application Priority Data

Mar. 8, 1996 [JP] Japan .................................. 8-051886
Sep. 18, 1996 [JP] Japan .................................. 8-246663

[51] Int. Cl.$^7$ .................................................. H04L 12/28
[52] U.S. Cl. .................................... 370/338; 455/554
[58] Field of Search .................................... 370/338, 328, 370/349, 352, 401, 460, 467; 455/554, 555, 556, 557, 567, 69, 70, 31.3; 379/88.17

[56] References Cited

U.S. PATENT DOCUMENTS

| 5,590,133 | 12/1996 | Billstrom | 370/338 |
|---|---|---|---|
| 5,717,737 | 2/1998 | Doviak et al. | 379/58 |
| 5,742,905 | 4/1998 | Pepe et al. | 455/445 |
| 5,793,762 | 8/1998 | Penners et al. | 370/389 |
| 5,796,727 | 8/1998 | Harrission | 370/338 |
| 5,802,465 | 9/1998 | Hamalainen et al. | 455/403 |
| 5,894,595 | 4/1999 | Foladare et al. | 455/556 |
| 5,896,369 | 4/1999 | Warsta et al. | 370/338 |
| 5,943,399 | 8/1999 | Bannister et al. | 379/88.17 |

FOREIGN PATENT DOCUMENTS

| 7-131842 | 5/1995 | Japan . |
|---|---|---|
| WO 95/16330 | 6/1995 | Japan . |
| 7-221773 | 8/1995 | Japan . |

*Primary Examiner*—Chi H. Pham
*Assistant Examiner*—Steven Nguyen
*Attorney, Agent, or Firm*—Brinks Hofer Gilson & Lione

[57] ABSTRACT

In a communication system across an in-office PC system (10) and an in-enterprise LAN system (20), in order to perform a transmission of packet data from a DDTE (22) on the LAN side to a M-DTE (14) on the personal station side without a need of a provision of complicated means, when receiving packet data addressed to the M-DTE (14) from the DTE (22), a LAN side control unit (23) transmits a connection request including the incoming packet address to a PBX (11) of the in-office PC system (10), the PBX (11) notifies a PS (13) of the incoming signal for the packet address through a CS(12), and on the other hand, the M-DTE (14) connected to the PS (13) acknowledges the incoming signal through the PS (13) and the CS (12) when the packet address which received this notice corresponds to the M-DTE (14), thereby achieving a connection. After the connection, the control unit (23) transmits packet data to the M-DTE (14).

13 Claims, 10 Drawing Sheets

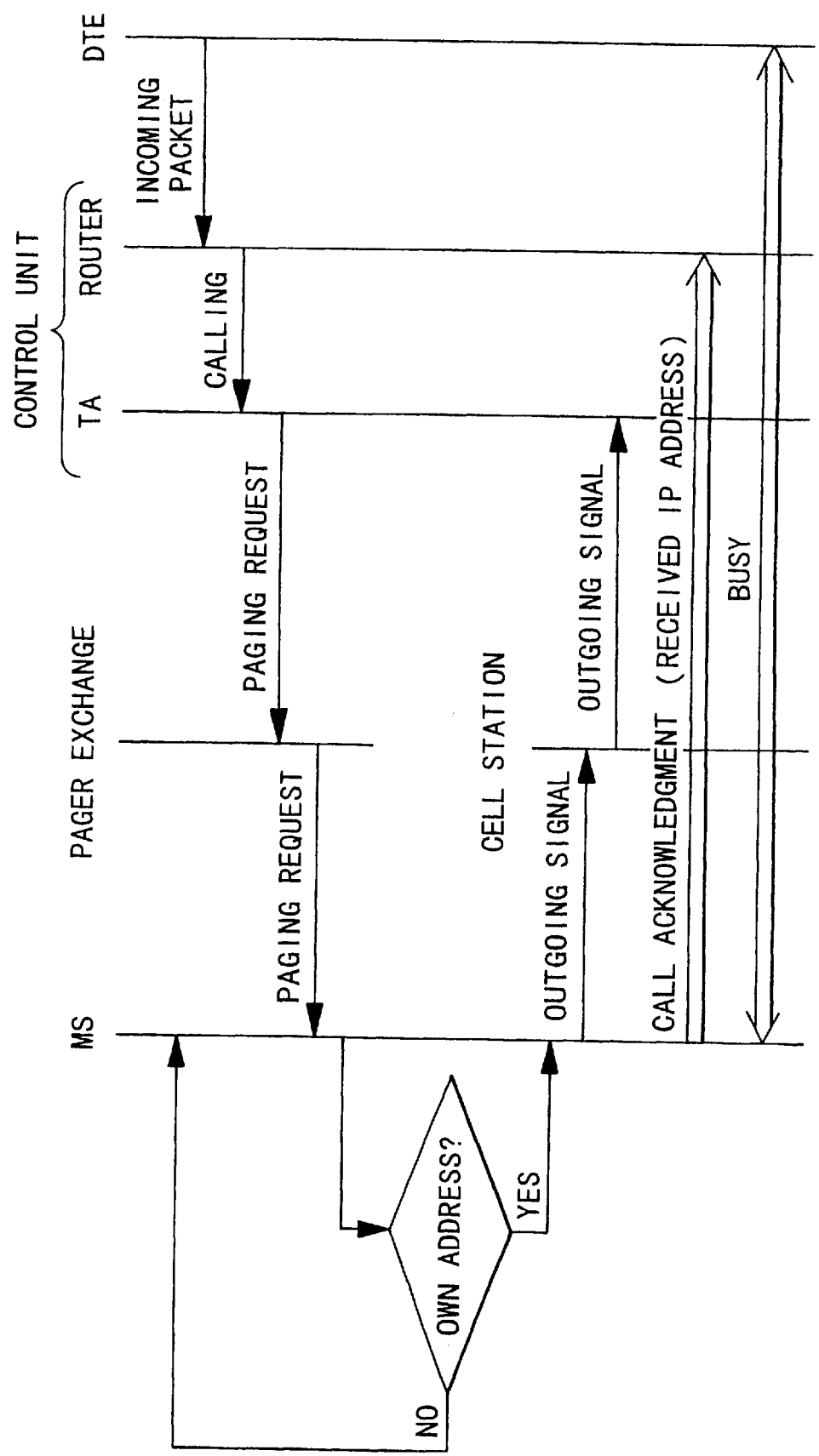

PACKET DATA TRANSFERRING METHOD FOR MOBILE RADIO DATA COMMUNICATION SYSTEM

TECHNICAL FIELD

This invention relates to a method of packet data transmission in a mobile radio data communication system which can be used in a virtual network across a mobile communications network and a LAN.

TECHNICAL BACKGROUND

Recently, personal communications technology as an extension of development of a cordless telephone technology has been progressed. And attention is focused on a wireless PBX (Private Branch eXchange) system which was developed based on this personal communication technology.

With respect to this wireless PBX system, as a result of further search and development of the mobility along with the development of wireless technology of telephone sets, it cam to be apparent that the wireless PBX system can be used not only in a service area under the control of a single wireless PBX system but also with respect to a movable area between PBXs by means of automatic registration of a current location of a given end system without a need of compelling a user or subscriber to make a meaningless change of registration (or activation of transmission of an incoming signal or the like).

On the other hand, there is currently an increasing need of a data communication through the Internet. There are two types of data communication methods; the first one is a method by way of a telephone line (line switch) and the second one is a method for performing a communication from a terminal device accommodated in a LAN. The method of using a LAN is mostly employed in the in-enterprise communication.

In this in-enterprise communication, it sometimes becomes necessary to use a system which is capable of performing a packet data communication across various physical networks as represented by a LAN such as Ethernet, etc. In order to perform a routing of packet data between end terminal devices across the various physical networks, it is required that each terminal device can uniquely be identified. To this end, each terminal device is assigned for use with an address (packet address) on a virtual network as represented by an IP (Internet Protocol) address, etc.

Hereinbefore, the Internet, which is based on the wireless PBX system where a data communication is performed chiefly by way of line switching and the LAN, has been described. The former is coming to be well accepted as a main communication means in many offices by applying mobility thereto, while the latter is becoming a main communication means for data communication.

Incidentally, a new data communication system is currently being searched and developed. In this new system, a wireless PBX system and a LAN are coupled and a data communication terminal device is connected to a personal station located in the wireless PBX system so that a data communication can be performed between this data communication terminal device and a data communication terminal device on the LAN side.

In the above case, in order to transmit packet data to the data communication terminal device under the control of the wireless PBX system from the LAN side, it is necessary for the LAN side to identify an IP address of that data communication terminal device because the data communication terminal device under the control of the wireless PBX system is one of the network terminal devices having a series of different physical addresses.

In order to deliver the above packet data to the particular data communication terminal device through the wireless PBX system, it is necessary that the wireless PBX system side identifies a physical address of the particular data communication terminal device, i.e., physical address of a personal station to which the specific data communication terminal device is connected, while referring to the IP address and that the wireless PBX system forms a physical link between the personal station and the LAN.

In order to form such a physical link, the IP address must primarily be determined from the IP address. To this end, there are required such complicated procedures that a connective relationship between each data communication terminal device and each personal station is fixed, or a means for obtaining a corresponding relationship between each data communication terminal device and each personal station is provided within the system, and so forth.

DISCLOSURE OF INVENTION

The present invention has been accomplished in view of the above situation. It is, therefore, an object of the present invention to provide a method of packet data transmission in a mobile radio data communication system, in which packet data can be transmitted from a LAN side to a given data communication terminal device on a personal station side without a need of such complicated procedures as mentioned above.

To achieve the above object, according to the present invention, there is provided a method of packet data transmission in a mobile radio data communication system comprising a personal station, a mobile data terminal equipment to be connected to the personal station, a wireless connection equipment for performing a wireless connection with the personal station, an exchange for connecting the personal station and a counterpart thereof through the wireless connection equipment, a LAN, a data terminal equipment on the LAN side connected to the LAN, and a control unit for performing a transmission control of packet data in the LAN and a transmission control of packet data between the exchange and the LAN, characterized in that the mobile data terminal equipment is assigned with a packet address to be used in the LAN, and the control unit is preliminarily stored therein a packet address corresponding to the mobile data terminal equipment; when transmitting packet data to the mobile data terminal equipment, the LAN side data terminal equipment transmits packet data including a packet address of the mobile data terminal equipment to the LAN; if the packet address included in the packet data received through the LAN is the packet address of the mobile data terminal equipment, the control unit reserves the packet data and requests the exchange to connect to the packet address; when requested a connection to the packet address, the exchange establishes a communication path for the control unit and transmits a signal including the packet address to the personal station through the wireless connection equipment; if the packet address included in the signal is a packet address corresponding to the mobile data terminal equipment, the personal station transmits an acknowledgment signal; when receiving the acknowledgment signal through the wireless connection equipment, the exchange acknowledges the connection to the packet address to the control unit; and when receiving the acknowledgment from the exchange, the control unit transmits the reserved packet data to the mobile data terminal equipment.

From another aspect of the invention, there is also provided a method of packet data transmission in a mobile radio data communication system comprising a personal station, a mobile data terminal equipment to be connected to the personal station, a wireless connection equipment for performing a wireless connection with the personal station, an exchange for connecting the personal station and a counterpart thereof through the wireless connection equipment, a LAN, a data terminal equipment on the LAN side connected to the LAN, and a control unit for performing a transmission control of packet data in the LAN and a transmission control of packet data between the exchange and the LAN, characterized in that the mobile data terminal equipment is assigned with a packet address to be used in the LAN, and the control unit is preliminarily stored therein a packet address corresponding to the mobile data terminal equipment; when transmitting packet data to the mobile data terminal equipment, the LAN side data terminal equipment transmits packet data including a packet address of the mobile data terminal equipment to the LAN; if the packet address included in the packet data received through the LAN is the packet address of the mobile data terminal equipment, the control unit reserves the packet data and requests the exchange to notify of the incoming signal to the packet address; when requested a notice of an incoming signal to the packet address, the exchange and transmits a signal including the packet address to the personal station through the wireless connection equipment without establishing a communication path for the control unit; if the packet address included in the signal is a packet address corresponding to the mobile data terminal equipment, the personal station transmits a call signal to the control unit; the exchange transmits an incoming signal to the control unit in response to the call signal through the wireless connection equipment; when receiving the incoming signal, the control unit transmits an acknowledgment signal to the exchange; when receiving the acknowledgment, the exchange establishes a communication path between the control unit and the personal station; and the control unit transmits the reserved packet data to the mobile data terminal equipment through the communication path.

With a method of packet data transmission in a mobile radio data communication system thus constructed in accordance with the present invention, there can be exhibited such effects that packet data can be transmitted from a data communication terminal device on the LAN side to a data communication terminal device on the personal station side without a need of fixing a connective relationship between each data communication terminal device and each personal station on a virtual network across a wireless network system of the type of line switching and the LAN and without a need of pursuing complicated procedures for providing a means for obtaining a corresponding relationship between an IP address and a physical address of the respective data communication terminal devices.

BRIEF DESCRIPTION OF DRAWINGS

FIG. 10 is a connection sequence diagram showing an operation of a mobile radio data communication system according to the sixth embodiment of the present invention.

BEST MODE FOR CARRYING OUT THE INVENTION

<Communication System to Which the Invention is Applied>

Figure 1:
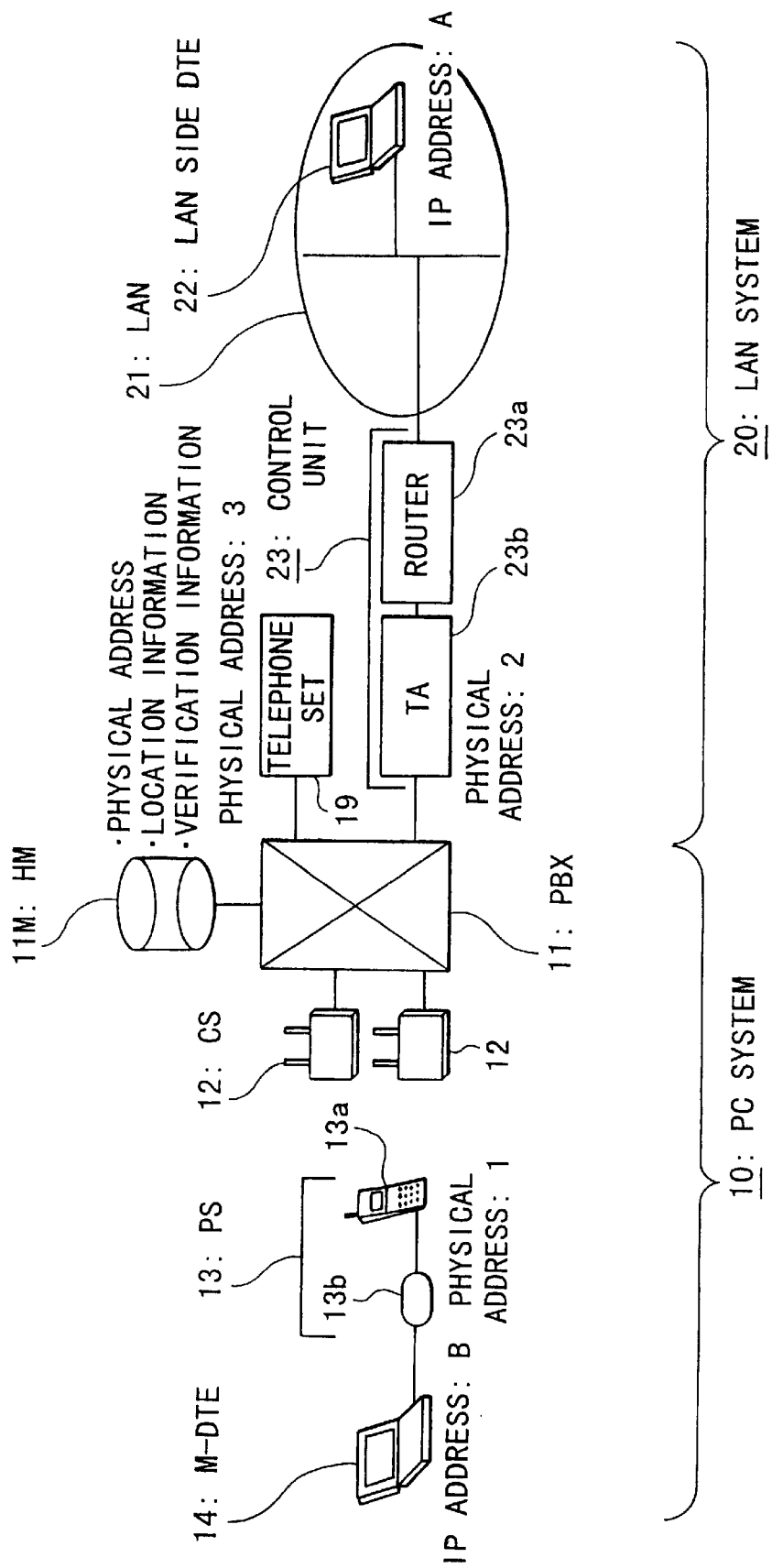
FIG. 1 is a diagram showing a configuration of an in-enterprise mobile radio data communication system applicable to the present invention.

FIG. 1 shows a configuration of an in-enterprise mobile radio data communication system as one example to which the present invention can be applied. This in-enterprise mobile data communication system comprises a combination of an in-office personal communication (PC) system 10 and an in-enterprise LAN system 20. This system usually performs a data communication using a TCP/IP (Transmission Control Protocol/Internet Protocol) as a communication protocol.

The in-office PC system 10 comprises a private branch exchange (hereinafter simply referred to as "PBX") 11, cell stations (hereinafter simply referred to as "CS") 12, and a personal station (hereinafter simply referred to as "PS") 13.

Here, the PBX 11 includes a control unit, a switching unit and a base band processing unit in addition to a home memory (HM) 11M for storing therein a physical address, location information, verification information, etc., of the PS 13 which is under the control of the PBX 11. By means of activity of those various elements, the PBX 11 controls the overall in-office PC system 10, switches the line for the information flowing on a communication channel, encoding voices, changes a communication channel, verifies the PS, manages a current location and so forth. Reference numeral 19 denotes an ordinary telephone set connected to the PBX 11.

Each CS (two are shown in FIG. 1) 12 includes a radio unit (modulation/demodulation unit), a control unit, and an interface unit with respect to the PBX 11. By means of activity of those various elements, each CS 12 undertakes a task for connection between the PS 13 in a wireless manner and for connection between the PBX 11 through a wire interface. Each CS 12 has a role as a relay means for a control signal and information between the PS 13 and the PBX 11.

The PS 13 comprises a radio unit (modulation/demodulation unit), a base band processing unit, an external terminal interface unit, and the like. The PS 13 performs a sending and receiving function of signal for a voice and a data communication, an encoding function of voice, and so forth. Among such PS 13, there exists one, as shown in FIG. 1, to which a mobile data terminal equipment (hereinafter simply referred to as "M-DTE") 14 having a serial interface as such RS232C is connected. As the PS 13, an mobile device body 13a having an adapter 13b connected thereto is employed. The PS 13 is connected at the adapter 13b to the M-DTE 14 through a serial interface. The adapter 13b employed here includes a protocol conversion unit and an interface unit. The adapter 13b performs a terminating function of the protocol. It should be noted that although the M-DTE, adapter and PS are separated in logical function, they are not necessarily physically separate bodies as shown but may be of an integral body.

On the other hand, the in-enterprise LAN system 20 comprises a LAN 21 using a physical medium such as Ethernet, for example. Connected to the in-enterprise LAN system 20 through an Ethernet board are a plurality of LAN side data terminal equipment devices (hereinafter simply referred to as DTE). It should be noted that the LAN 21 may be other physical medium than the Ethernet.

The LAN 21 is divided into a plurality of sub-networks. Each sub-network is connected to the PBX 11 of an in-office PC system 10 through a controller 23 which comprises a router 23a and a terminal adapter (hereinafter simply referred to as "TA") 23b.

The router 23a performs a routing function of packet data between the particular sub-network and other sub-network, and between the particular sub-network and the in-office PC system 10. The TA 23b comprises a protocol conversion unit, and an interface unit. The TA 23b is connected to the PBX 11 through an ISDN or a private interface. The TA 23b undertakes a task for performing a sending and receiving function of signal, terminating function of protocol, and so forth.

<2: Connection Procedure of Communication System>

Next, a connection procedure to be performed in the in-enterprise communication system when packet data are transmitted, will be described.

<2-1: In Case Packet Data are Transmitted from PS 13 to Other PS 13>

First, a connection procedure to be performed in this communication system when packet data are transmitted from the PS 13 to other PS 13, is described.

The connection procedure is performed in accordance with the following sequential steps.

(1) The PS 13 on the sender side requests the CS 12 to establish a radio channel.

(2) The CS 12 establishes a radio channel between the PS 13 on the sender side.

(3) The PS 13 one the sender side designates a physical address (extension number) of the PS 13 on the receiver side.

(4) The PBX 11 sends an incoming signal to the CS 12, designating a call number (this being occasionally the same as the extension number) of the PS 13 on the sender side based on the physical address.

(5) The CS 12 performs a notifying function of an incoming signal by the call number designated by the incoming signal.

(6) The PS 13 on the receiver side requests the CS 12 to establish a radio channel when the call number, by which the incoming signal is notified, is in agreement with a call number which the PS 13 itself has.

(7) The CS 12 establishes a radio channel between the PS 13 on the receiver side in accordance with this request.

(8) The PS 13 on the receiver side notifies the CS 12 of an incoming signal acknowledgment.

(9) The PBX 11 establishes a communication path between the PS 13 on the receiver side.

<2-2: In Case Packet Data are Transmitted Between One Pair of M-DTEs, or Between M-DTE and DTE>

Figure 2:
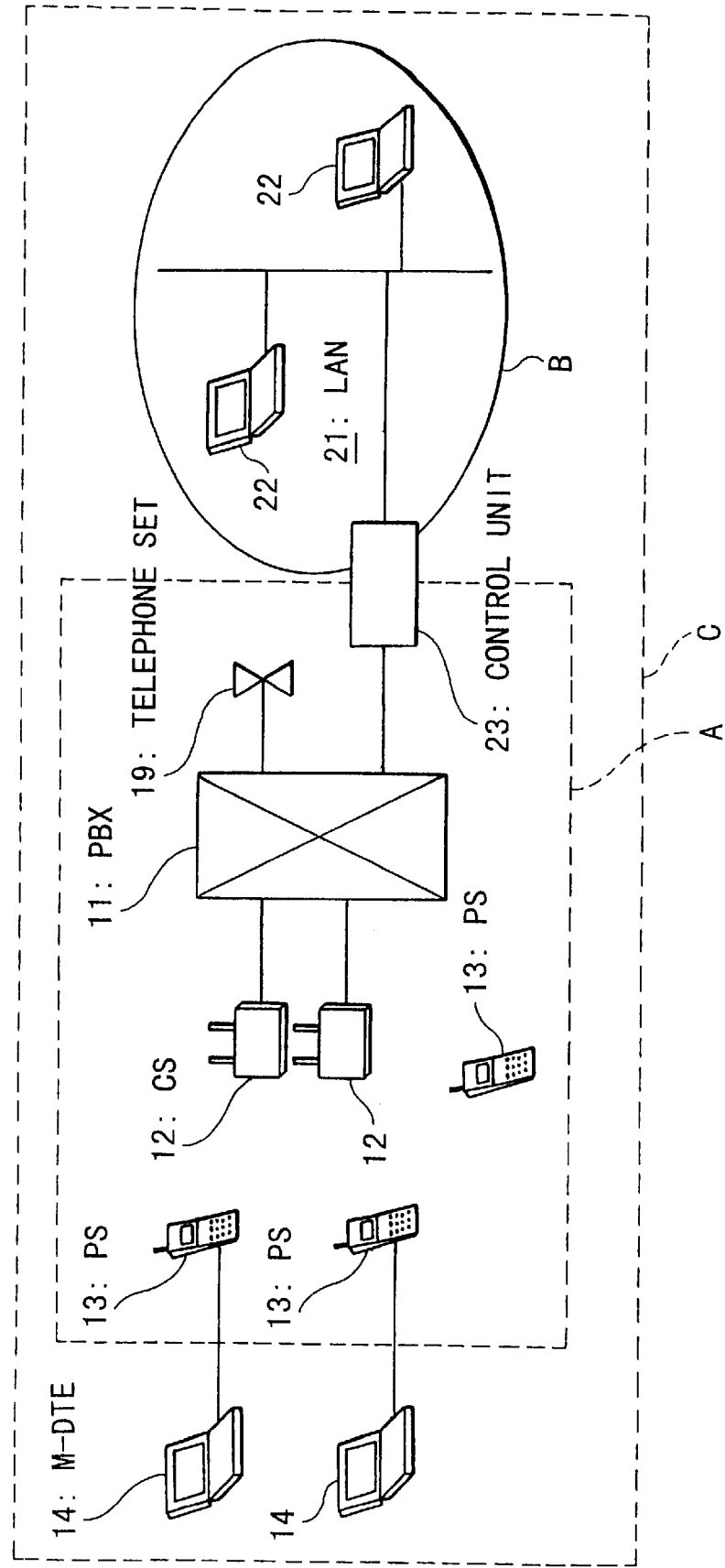
FIG. 2 is a diagram for explaining an address management in the above communication system.

Next, a connection procedure to be performed in this communication system when packet data are transmitted from the PS 13 to other PS 13, is described. The problem of conformity of address management between networks which constitute the in-enterprise communication system is brought up. FIG. 2 is a diagram in which the in-enterprise communication system is divided from this view point of address management.

As shown in this Figure, in the in-enterprise communication system, there are an area A where a physical address (telephone number) by the PBX 11 is used (i.e., part excluding M-DTE of the in-office PC system 10), and an area B where a physical address (Ethernet address) by the LAN is used (i.e., in-enterprise LAN system 20). In order to make it possible to perform a data communication across the areas A and B, IP addresses with an ensured uniqueness are assigned to the M-DTE and DTE within the system over the entire area of the system including those areas.

In order to perform a routing function between a pair of data communication terminal equipment devices which belong to areas having a different address management, a connection procedure in the IP layer and a connection procedure in the physical layer are both necessary. For this reason, it becomes necessary that an address (IP address) to be used in the IP layer and a physical address (Ethernet in the in-enterprise LAN system 20, and an extension number in the in-office PC system 10) are in mutually corresponding relation.

Here, the in-enterprise LAN system 20 is of a connectionless type network, in which a node (in general, router) for relaying the IP packet converts the IP address and the Ethernet address and performs a relay transmission of the IP packet. Therefore, there is no problem in address management with respect to routing in the LAN 21.

On the other hand, the in-business PC system 10 is of a connection type network, in which an end-to-end physical link is established through the PBX 11 and a communication is performed by line switching. Therefore, for performing a routing between the M-DTE and the DTE or between the M-DTE and other M-DTE, a communication counterpart (DTE or other M-DTE) of the particular M-DTE is identified by the IP address. However, because there is located the in-office PC system 10 on the communication route to the communication counterpart, it is absolutely necessary to establish a physical link within the system.

In case packet data are transmitted, for example, from the M-DTE 14 of FIG. 1 to the DTE 22 (IP address: A) in the LAN 21, it is good enough that a physical link for connecting the particular M-DTE 14 to the control unit 23 is established within the in-office PC system 10 and therefore, a routing can be performed by way of a simple procedure. The procedure is as follows.

First, the M-DTE 14 requests the PS 13 to transmit a signal to the TA 23a of the control unit 23. Upon receipt of this request, the PS 13 identifies a physical address (=2) of the TA 23b and sends a connection request to the PBX11 through the CS 12. As a consequence, a physical link for connecting the PC 13 and the TA 23b together is established by the PBX 11.

Then, through the physical link thus established, an IP address (=A) of the DTE 22 is transmitted from the M-DTE 14 to the router 23a of the control unit 23. Thereafter, packet data are transmitted from the M-DTE 14 to the DTE 22 utilizing the relay transmission of the IC packet by way of the router.

On the contrary, an attempt for transmitting packet data from the DTE 22 to the M-DTE will encounter the following problems.

Specifically, the DTE 22 requests a connection with the M-DTE 14, specifying an IP address (=B) of the M-DTE 14. In order to fulfill the request for connection, it is necessary to establish a physical link from the router 23a to the physical address (i.e., PS 13 to which the M-DTE 14 is connected) of the M-DTE 14. In order to establish this physical link, it is necessary to obtain a physical address (=1) from the IP address (=B) of the M-DTE 14.

In order to primarily convert the IP address to the physical address, it is necessary that the M-DTE 14 within the in-office PC system are all connected to the particular PS 13 to fix the connective relation. However, if the connective relation between the M-DTE and the PS is fixed as mentioned, the system badly lacks flexibility. On the other hand, if such a connective relation is not fixed, it becomes necessary to provide a very complicated means within the system, such as means for securing a corresponding relationship between the IP address of each data communication terminal equipment and the physical address.

The present invention makes it possible to provide a routing for transmitting packet data from the DTE to the M-DTE without a need of compelling a fixed connective relation between the M-DTE and the PS and a management of corresponding relationship between the IP address and the physical address.

Specific embodiments thereof will now be described hereinafter.

<3: First Embodiment>

Figure 3:
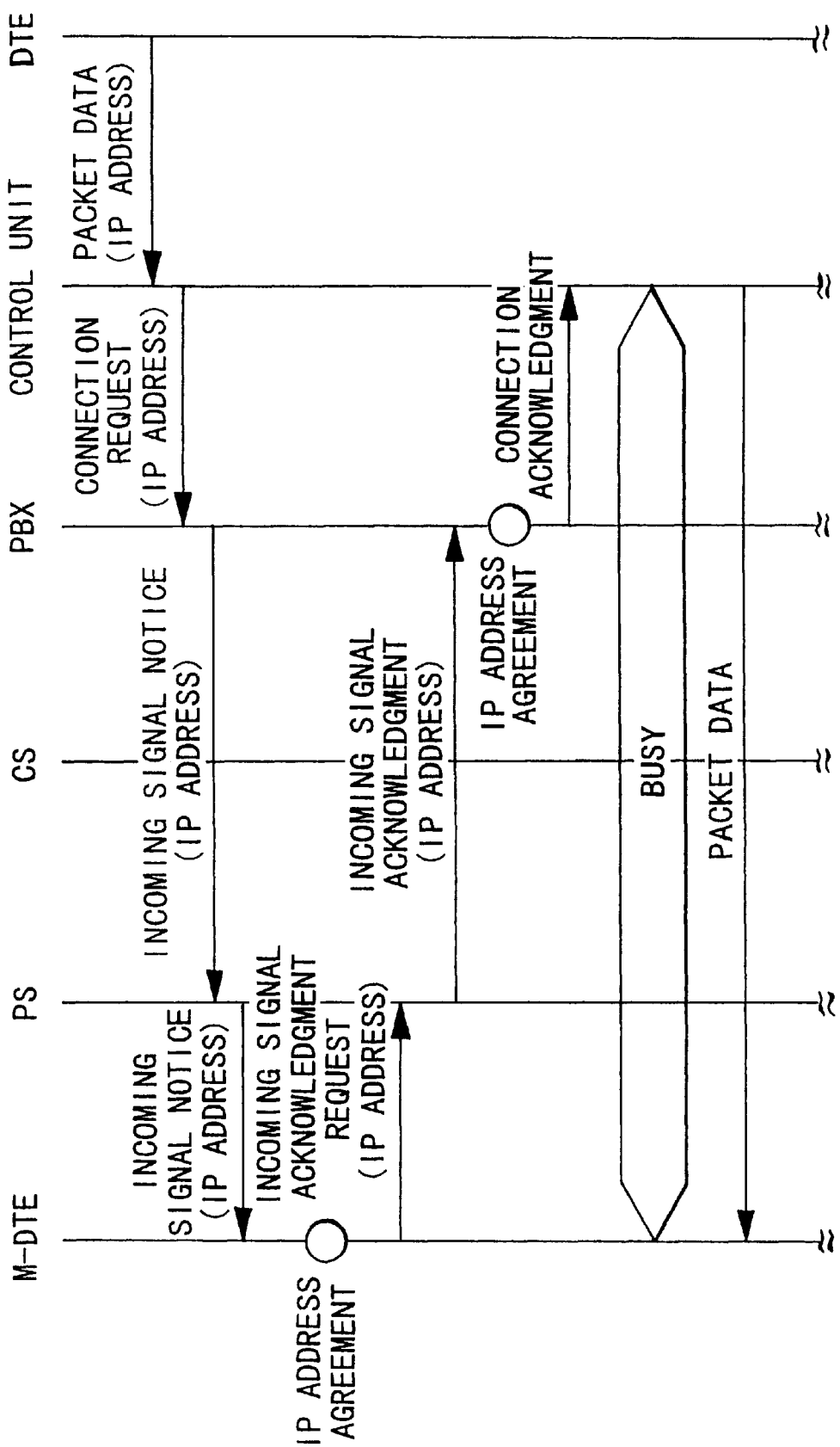
FIG. 3 is a connection sequence diagram showing an operation of a mobile radio data communication system according to the first embodiment of the present invention.

FIG. 3 is a diagram showing a connection sequence when packet data are transmitted from the DTE to M-DTE in a mobile radio data communication system according to the first embodiment of the present invention.

First, in this embodiment, the control unit includes a memory unit for storing therein IP addresses.

All IP addresses of the M-DTE connected through the control unit in the in-office PC system are stored in this memory unit.

When transmitting packet data to a M-DTE of the in-office PC system, the DTE in the LAN transmits packet data including the IP address of the M-DTE into the LAN.

The packet data thus transmitted are received by the control unit in the LAN. At that time, the control unit judges whether or not the IP address included in the received packet data is coincident with one of the IP addresses of the M-DTE stored in the memory unit.

As a result of the judgment, if the received IP address is determined as the IP address of the M-DTE, the control unit reserves the received packet data and sends a connection request to the PBX in the in-office PC system. This connection request includes information indicating a fact that there is an incoming signal to the IP address of the M-DTE, and the particular IP address.

When receiving this connection request, the PBX sends an incoming signal notice message to all the CS which controls a call area of the particular IP address. This incoming signal notice message also includes information indicating a fact that there is an incoming signal to the IP address of the M-DTE, and the particular IP address.

The incoming signal notice message thus sent is transmitted to each PS in a radio section of each CS through the CS. When receiving the incoming signal notice message, each PS analyzes the content of the message. Here, because the incoming signal notice message received from the CS includes the information indicating a fact that there is an incoming signal to the IP address of the M-DTE, the PS detects an IP address from the incoming signal notice message and transmits an incoming signal notifying signal including this IP address to the M-DTE through an adapter. At the time of transmission, the adapter performs a protocol conversion between the PS and the M-DTE.

When receiving the incoming signal notifying signal, the M-DTE compares the IP address included in this incoming signal notifying signal with an IP address assigned to the particular M-DTE. As a result of the comparison, if both the IP addresses are not in coincident with each other, the M-DTE makes no response at all. On the other hand, if both the IP addresses are in coincident with each other, the M-DTE recognizes a fact that there is an incoming signal to the particular M-DTE, and sends an incoming signal acknowledgment request to the PS. This incoming signal acknowledgment request includes the IP address of the particular M-DTE.

When receiving the incoming signal acknowledgment request from the M-DTE, the PS sends an incoming signal acknowledgment message to the PBX through the CS. This incoming signal acknowledgment message includes information indicating a fact that the incoming signal is addressed to the IP address, a PS identification number for identifying the PS as the sender of the incoming signal acknowledgment request, and the IP address included in the above incoming signal acknowledgment request.

When receiving this incoming signal acknowledgment massage, the PBX verifies the PS by identifying the PS based on the PS identification number included in the incoming signal acknowledgment message. By doing so, rightness of the PS is ascertained. In case the incoming signal acknowledgment is determined as a correct acknowledgment from a right PS, the PBX performs a function for establishing a communication line between the PS and the control unit. That is, the PBX refers to the IP address included in the incoming signal notice message transmitted in the past for comparison with the IP address included in the incoming signal acknowledgment message received from the PS at this time. As a result of comparison, if both the addresses are in agreement with each other, a connection acknowledgment is sent to the control unit as a sender of the connection request which causes the transmission of the incoming signal notice message.

By doing so, a physical link is established between the PS and the control unit, and the packet data, which are transmitted from the DTE in the LAN and received by the control unit, are transmitted to the M-DTE via the route PBX, CS, PS in the in-business PC system.

In such an in-office PC system, a TDMA is generally used as a radio access system, and a TDD is used as a duplex system. For this reason, between the PS and the CS, packet data can be transmitted through a communication channel, and other signal and messages can be transmitted through a control channel which is used for controlling a wireless connection.

<4: Second Embodiment>

Figure 4:
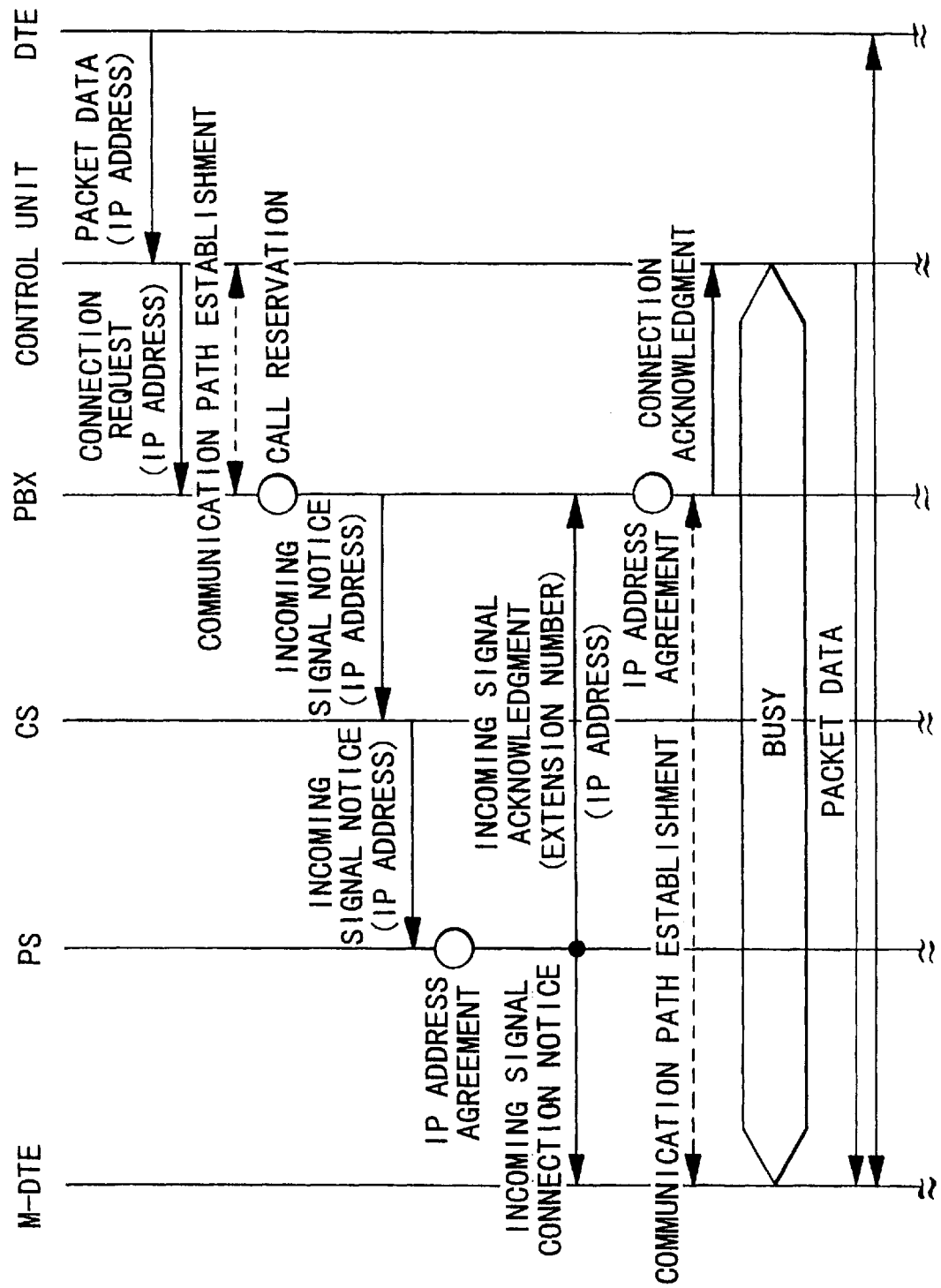
FIG. 4 is a connection sequence diagram showing an operation of a mobile radio data communication system according to the second embodiment of the present invention.

FIG. 4 is a diagram showing a connection sequence for transmitting packet data from the DTE to M-DTE in an in-enterprise mobile radio data communication system. In this embodiment, the incoming signal acknowledgment operation, which is performed by the M-DTE in the first embodiment, is performed by the PS. It should be noted that this incoming signal acknowledgment operation may be performed by the adapter, instead of the PS body, which adapter has the task for converting a protocol between the PS and the M-DTE.

In this embodiment, the PS stores therein the IP address of the M-DTE which is to be connected to the PS. As in the first embodiment described above, when the control unit receives the packet data including the IP address addressed from the DTE in the LAN to the M-DTE, a connection request including the particular IP address of the M-DTE is sent from this control unit to the PBX. Then, an incoming signal notice message including the particular IP address is sent from the PBX to the PS through the CS. At that time, the PS judges whether or not the IP address included in this incoming signal notice message is in agreement with the IP address of the M-DTE connected to the PS. As a result of the judgment, if both the IP addresses are in agreement, the PS sends an incoming signal acknowledgment message to the PBX. And the PBX performs a procedure necessary for establishing a communication line between the PS and the control unit in accordance with this incoming signal acknowledgment message.

When the communication line is established between the PS and the control unit in this way, the PS sends an incoming signal connection notice to the M-DTE to the effect that a communication can be performed. When receiving this notice, the M-DTE activates an application software for receiving the packet data which is transmitted from the control unit via the PBX, CS, and PS. Of course, when the M-DTE is normally in the state ready to receive the packet data, the PS may send the packet data to the M-DTE without notifying the M-DTE of that a communication can be performed.

In some instances, the packet data are frequently transmitted but in other instances, the packet data are intermittently transmitted at time intervals. In order to cope with the latter case, when the packet data are not frequently received in spite of that the M-DTE is in a state able to receive packet data, the communication line may be established between the PS and the control unit only when packet data are sent to the M-DTE. The same is also applicable to the case where packet data are transmitted from the M-DTE to the DTE in the LAN via the control unit. In order to make it possible to perform such controlling, an arrangement may be made such that an outgoing signal is transmitted only when the PS or adapter receives a data transmission request from the M-DTE and an incoming signal acknowledgment for receiving packet data is made only when an incoming signal to the IP address is detected.

In this embodiment, the M-DTE is not required to have a special function for an incoming signal acknowledgment. Therefore, there are such advantages that the M-DTE can be simplified in structure.

<5: Third Embodiment>

Figure 5:
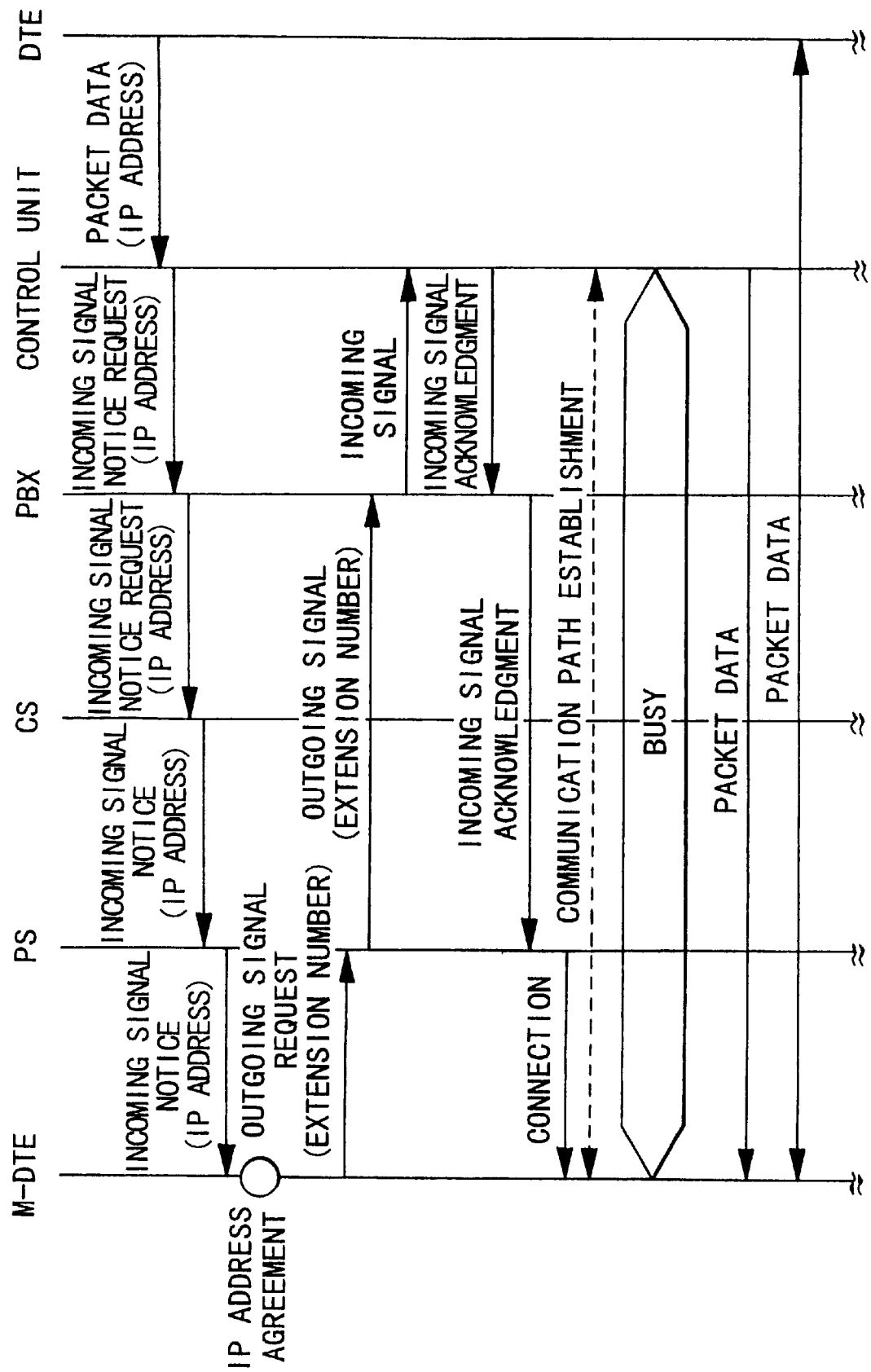
FIG. 5 is a connection sequence diagram showing an operation of a mobile radio data communication system according to the third embodiment of the present invention.

In the first and second embodiments, a system is employed in which a communication line is established between the PS and the control unit when the M-DTE or PS acknowledges the incoming signal from the control unit. In that system, however, the communication channel or path between the control unit and the PBX occupies the line irrespective of an acknowledgment of the incoming signal to be performed by the M-DTE or PS. This means that when neither the M-DTE nor the PS makes an acknowledgment of the incoming signal, the line is meaninglessly occupied. Thus, in this embodiment, between the router of the control unit and the TA, between the TA of the control unit and the PBX, and between the PBX and the CS, a message (incoming signal notice request message) for requesting an incoming signal notice at the IP address is sent, so that the M-DTE, that has received this notice, can call up the control unit, thus enabling to avoid such a meaningless occupation of line. Operation of this embodiment will be described hereinafter with reference to a connection sequence diagram of FIG. 5.

First, when receiving packet data from the DTE, the control unit confirms an addressee of this transmission signal based on the IP address included in the packet data. If the addressee of the packet data is the M-DTE, the particular packet data are reserved and an incoming signal notice request message including the IP address of the packet data is sent to the PBX without a need of occupying a line.

The PBX sends this incoming signal notice request message to the CS. Then, the CS takes out the IP address from this incoming signal notice request message and performs an incoming signal notice, which includes this IP address, to the PS. When receiving the incoming signal notice with respect to the IP address, the PS forms an incoming signal notice number using the IP address included in the incoming signal notice and sends this incoming signal notifying signal to the M-DTE.

The M-DTE judges whether or not the IP address included in this incoming signal notifying signal is in agreement with the IP address which is assigned to the particular M-DTE. If the judgment result is affirmative, the M-DTE requests the PS to send a signal to the control unit.

Examples of the method for requesting of an outgoing signal (call) to the control unit are as follows.

(a) The M-DTE preliminarily stores a telephone number (extension number) of the control unit in the memory unit and requests the PS to send an outgoing signal to this telephone number.

(b) The telephone number of the control unit, in addition to the IP address of the M-DTE, is included in the incoming signal notice request message which the control unit transmits, and the telephone number of the control unit is notified to the M-DTE via the PBC, CS and PS. The M-DTE requests the PS to send a signal to the telephone number which received this notice.

The PS sends an outgoing signal in accordance with the request thus made, and the PBX notifies the control unit of an incoming signal from the PBX. Then, when he control unit sends the incoming signal acknowledgment to the PS through the PBX, a communication path from the control unit to the M-DTE is established. Confirming that the communication path is established, the control unit transmits the reserved packet data towards the M-DTE.

According to this embodiment, because an incoming signal can be notified irrespective of the number of the communication paths between the control unit and the PBX, resources can effectively be utilized.

It should be noted that in this embodiment, the M-DTE which received the incoming signal notice may sends an outgoing signal to other control unit than the control unit which requested of the notice. For example, there is a possibility that in case the M-DTE receives a roaming service via a visitor PBX, packet data are transmitted from the DTE of the LAN to the M-DTE, and the control unit connected to a home PBX which is the original PBX of the M-DTE receives the packet data and lodges an incoming signal notice request. In this case, the M-DTE, which received the incoming signal, sends an outgoing signal designating a control unit which is currently connected to the visitor PBX which receives the roaming service, instead of the control unit which lodged the incoming signal notice request. The reason is that the communication path can be made shorter if the above-mentioned arrangement is made. However, for adopting this method, it is required to satisfy the conditions that a negotiation is made between the control units on the home PBX side and on the visitor PBX side in the respect that the M-DTE calls up the control unit on the visitor PBX side in response to an incoming signal notice request lodged by the control unit on the home PBX side.

<6: Fourth Embodiment>

Figure 6:
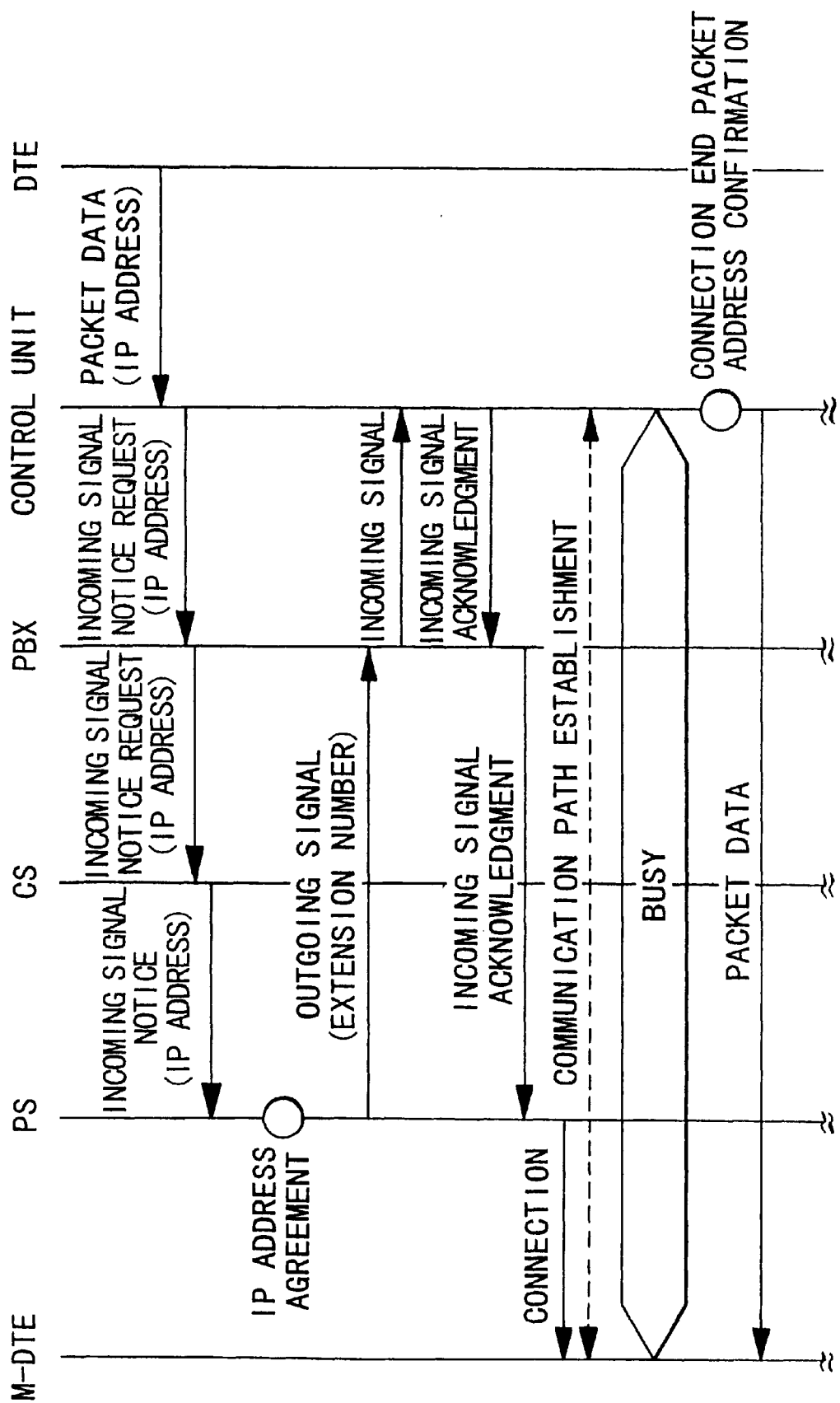
FIG. 6 is a connection sequence diagram showing an operation of a mobile radio data communication system according to the fourth embodiment of the present invention.

FIG. 6 is a diagram showing a connection sequence for transmitting packet data from the DTE to the M-DTE in a mobile radio data communication system according to the fourth embodiment of the present invention. It should be noted that this embodiment is a combination of the second embodiment and the third embodiment.

First, when receiving packet data from the DTE, the control unit confirms an addressee of this transmission signal based on the IP address included in the packet data. If the addressee of the packet data is the M-DTE, the particular packet data are reserved and an incoming signal notice request message including the IP address of the packet data is sent to the PBX without a need of occupying a line.

The PBX sends this incoming signal notice request message to the CS. Then, the CS takes out the IP address from this incoming signal notice request message and performs an incoming signal notice, which includes this IP address, to the PS.

The PS preliminarily stores the IP address of the M-DTE connected to the PS in the memory unit. When receiving the incoming signal notice, the PS judges whether or not the IP address included in this incoming signal notice is in agreement with the IP address in the memory unit, i.e., whether or not there is an incoming signal to the IP address of the M-DTE. If the judgment result is affirmative, the PS sends a signal to the preliminarily stored telephone number (extension number), and the PBX notifies the control unit of the incoming signal from the PBX. When the control unit sends an incoming signal acknowledgment to the PS through the PBX, a communication path from the control unit to the M-DTE is established. When confirming that the communication path is established, the control unit transmits the reserved packet data towards the M-DTE.

Here, in order for the control unit to transmit packet data to the M-DTE, it is necessary that the control units recognizes the incoming signal from the M-DTE. Methods for fulfilling the above requisite are as follows.

(a) The PS sends an outgoing signal request including therein the ID address of the M-DTE and sends the IP address further to the control unit through the CS and PBX. This control unit recognizes the incoming signal from the M-DTE by receiving the IP address of the M-DTE.

(b) Packet data are sent from the M-DTE to the control unit after the communication path is established. The control unit recognizes the M-DTE from the IP address (i.e., IP address of the M-DTE) of the sender included in the packet data.

<7: Fifth Embodiment>

In the first through fourth embodiments, only one kind of packet address (IP address) is assigned to the M-DTE. This embodiment is intended to cope with a case where a plural kinds of packet addresses are assigned to a single M-DTE.

That is, the system according to this embodiment includes a LAN controlled by other protocol than the IP, in addition to the LAN controlled by the IP protocol. Telephone lines (including ISDN) of the PBX are connected to the control units of the respective LANs. The DTE belonging to the respective LANs can send and receive the packet data between the M-DTE in accordance with the respective protocols. The packet addresses used at that time are determined so as not to be duplicated between the LANs.

Therefore, presuming that three kinds of LANs, LAN 1, LAN 2 and LAN3, are provided in the system, the M-DTE is assigned with three kinds of packet addresses corresponding to those LANs.

When the M-DTE sends and receives packet data between the DTE in the respective LANs, it becomes necessary that a physical link is established between the PS and the control unit. The control unit as the connecting end of the PS is different depending on which LAN's DTE becomes the counterpart of the communication. That is, when the M-DTE receives the packet data 1 from the DTE 1 in the LAN 1, it is necessary that the control unit 1 of the LAN 1 is connected to the PS. When from the DTE 2 in the LAN 2, it is necessary that the control unit 2 of the LAN 2 is connected to the PS. When from the DTE 3 in the LAN 3, it is necessary that the control unit 3 of the LAN 3 is connected to the PS.

Therefore, when an incoming signal is notified from the DTE of the LAN, it becomes an important problem that how the M-DTE or PS side can be connected to a correct control unit.

In this embodiment, as in the first through fourth embodiments, the M-DTE and the control unit of the LAN is connected by sending an incoming signal notice message, etc., including the packet address of the M-DTE from the LAN side via the PBX. The packet addresses included in the incoming signal notice message, etc. are also different depending on which LAN. That is, although the incoming signal notice message, etc. sent to the PS through the PBX includes the packet address of the M-DTE, this packet address is the packet address 1 used in the LAN 1 when the sender is the control unit 1 of the LAN 1. But the packet address is the packet address 2 used in the LAN 2 when the sender is the control unit 2 of the LAN 2, and the packet address 3 used in the LAN 3 when the sender is the control unit 3 of the LAN 3.

This embodiment utilizes the above fact so that the PS can be connected to proper control unit. As a specific system, there can be contemplated four kinds of systems in which the technical concepts so far described are applied to the first through fourth embodiments.

<7-1: System Corresponding to First Embodiment>

First, a system in which the technical concepts are applied to the first embodiment is described. In this system, presume that the DTE 1 of the LAN 1 transmits packet data to the M-DTE 1. In this case, the control unit 1 of the LAN 1 receives this packet data 1. The control unit 1 reserves the packet data 1 and requests the PBX of an incoming signal to the packet address 1 in the packet data. The PBX establishes a communication path for the control unit 1 and notifies the CS of the incoming signal to the packet address 1. The CS transmits an incoming signal notifying signal including the packet address 1 to the PS.

When receiving the incoming signal notifying signal including the packet address, the PS transmits the incoming signal including the packet address to the M-DTE. Here, the M-DTE stores therein a packet address table comprising the packet address 1 corresponding to LAN 1, a packet address 2 corresponding to LAN 2, and a packet address 3 corresponding to LAN 2, as a packet address for identifying the M-DTE. The M-DTE refers to the packet address included in the received incoming signal notifying signal for comparing with each packet address in this address table. In this case, since the packet address 1 is included in the incoming signal notifying signal, the M-DTE requests the PS of an acknowledgment of the incoming signal to the packet address 1. Upon receipt of this request, the PS transmits an acknowledgment signal including the packet address 1 to the CS.

The CS establishes a communication path with respect to the PS and at the same time, transmits an acknowledgment signal for the incoming signal addressed to the packet address 1. When receiving the acknowledgment signal for the incoming signal addressed to the packet address 1, the PBX judges whether or not there is one in the incoming signal request for the packet address which corresponds to the packet address 1. In this case, among the incoming signal request received by the PBX, there is the incoming signal request including the packet address 1 which the control unit 1 transmitted. For this reason, the PBX establishes a communication path between the CS and at the same time, transmits an acknowledgment signal to the control unit 1.

When receiving an acknowledgment signal from the PBX, the control unit 1 recognizes that packet data can now be sent and received between the M-DTE, and transmits the reserved packet data 1 to the M-DTE. Thereafter, a sending and receiving operations are started between the M-DTE and the LAN 1.

<7-2: System Corresponding to Second Embodiment>

Next, a system in which the technical concepts are applied to the second embodiment is described. In this system, presume that the DTE 1 of the LAN 1 transmits packet data to the M-DTE 1. In this case, the procedure is the same as the system corresponding to the first embodiment up to the procedure for transmitting the incoming signal notifying signal including the packet address 1 to the PS.

In this system, the PS stores therein a packet address table for the packet address corresponding to each LAN for identifying the M-DTE. When receiving the incoming signal notifying signal sent from the CS in the manner as mentioned above, the PS refers to the packet address included in the received incoming signal notifying signal for comparing with each packet address in this address table. In this case, since the packet address 1 is included in the incoming signal notifying signal, the PS requests the CS of an acknowledgment of the incoming signal to the packet address 1. At the same time, the PS notifies the M-DTE of the incoming signal. The M-DTE is established in a state capable of sending and receiving packet data by the incoming signal notice from this PS. It should be noted that the M-DTE may be established in a state capable of sending and receiving packet data at the time the first packet data are received. In the alternative, it may preliminarily be established in a state capable of sending and receiving packet data.

The CS establishes a communication path with respect to the PS, and at the same time, transmits an acknowledgment signal for the incoming signal addressed to the packet address 1 to the PBX. When receiving the acknowledgment signal for the incoming signal addressed to the packet address 1, the PBX judges whether or not there is one in the incoming signal request for the packet address which is in corresponding relation with the packet address 1. In this case, among the incoming signal request received by the PBX, there is the incoming signal request including the packet address 1 which the control unit 1 transmitted. For this reason, the PBX establishes a communication path between the CS and at the same time, transmits an acknowledgment signal to the control unit 1.

When receiving an acknowledgment signal from the PBX, the control unit 1 recognizes that packet data can now be sent and received between the M-DTE, and transmits the reserved packet data 1 to the M-DTE. Thereafter, a sending and receiving operations are started between the M-DTE and the LAN 1.

<7-3: System Corresponding to Third Embodiment>

Next, a system in which the technical concepts are applied to the third embodiment is described. Operation of this system is described with reference to FIG. 7.

In this system, presume that the DTE 1 of the LAN 1 transmits packet data to the M-DTE 1. In this case, the control unit 1 of the LAN 1 receives this packet data. The control unit 1 reserves the packet data 1 and requests the PBX of the incoming signal notice to the packet address 1 in the packet data. The PBX requests the CS of the incoming signal notice to the packet address 1 without establishing a communication path with respect to the control unit 1. The CS notifies of the incoming signal by the packet address 1.

When receiving the incoming signal including the packet address, the PS transmits the incoming signal including the packet address to the M-DTE. Here, as exemplified in FIG. 7, the M-DTE stores therein a table which defines a corresponding relation among the packet address, the connection end number (i.e., telephone number of the control unit) corresponding thereto, and an application software for sending and receiving packet data between the control unit. Since the packet address 1 is included in the incoming signal, the M-DTE reads the connection end number 1 (telephone number of the control unit 1) corresponding to the packet address 1, and requests the PS of a call for this connection end number 1.

In response to this request, the PS makes a calling to the connection end number 1. At the same time, the PS notifies the M-DTE of the incoming signal. The M-DTE is established in a state capable of sending and sending the packet data by the incoming signal notice from the PS. It should be noted that the M-DTE may be established in a state capable of sending and receiving the packet data at the time the first packet data are received. In the alternative, it may preliminarily be established in a state capable of sending and receiving packet data.

The CS establishes a communication path between the PS, and at the same time, transmits a request for an outgoing signal to the connection end number 1, to the PBX. The PBX transmits an incoming signal to the control unit 1.

When receiving this incoming signal, the control unit 1 transmits an acknowledgment signal to the PBX. When receiving this acknowledgment signal, the PBX establishes a communication path between the PS. Here, the call signal from the PS includes the packet address 1 and this packet address 1 is transmitted to the control unit 1. Therefore, the control unit 1 can recognize the connection of the M-DTE having the packet address 1 by receiving this packet address 1. Then, the control unit 1 judges that the packet data can now be sent and received between the M-DTE and transmits the reserved packet data 1 to the M-DTE. Thereafter, a sending and receiving of the packet data are started between the M-DTE and the LAN 1.

As a method for the control unit 1 to recognize the M-DTE as a counterpart of connection, a method may be employed in which packet data are sent from the M-DTE to the control unit 1 after connection, and the control unit 1 recognizes the M-DTE from the sender's address included in this packet data.

<7-4: System Corresponding to Fourth Embodiment>

Next, a system in which the technical concepts are applied to the fourth embodiment is described. Presume that in this system, the DTE 1 of the LAN 1 transmits packet data to the M-DTE 1. In this case, the procedure is the same as the system corresponding to the first embodiment up to the procedure for transmitting the incoming signal notifying signal including the packet address 1 to the PS.

Figure 7:
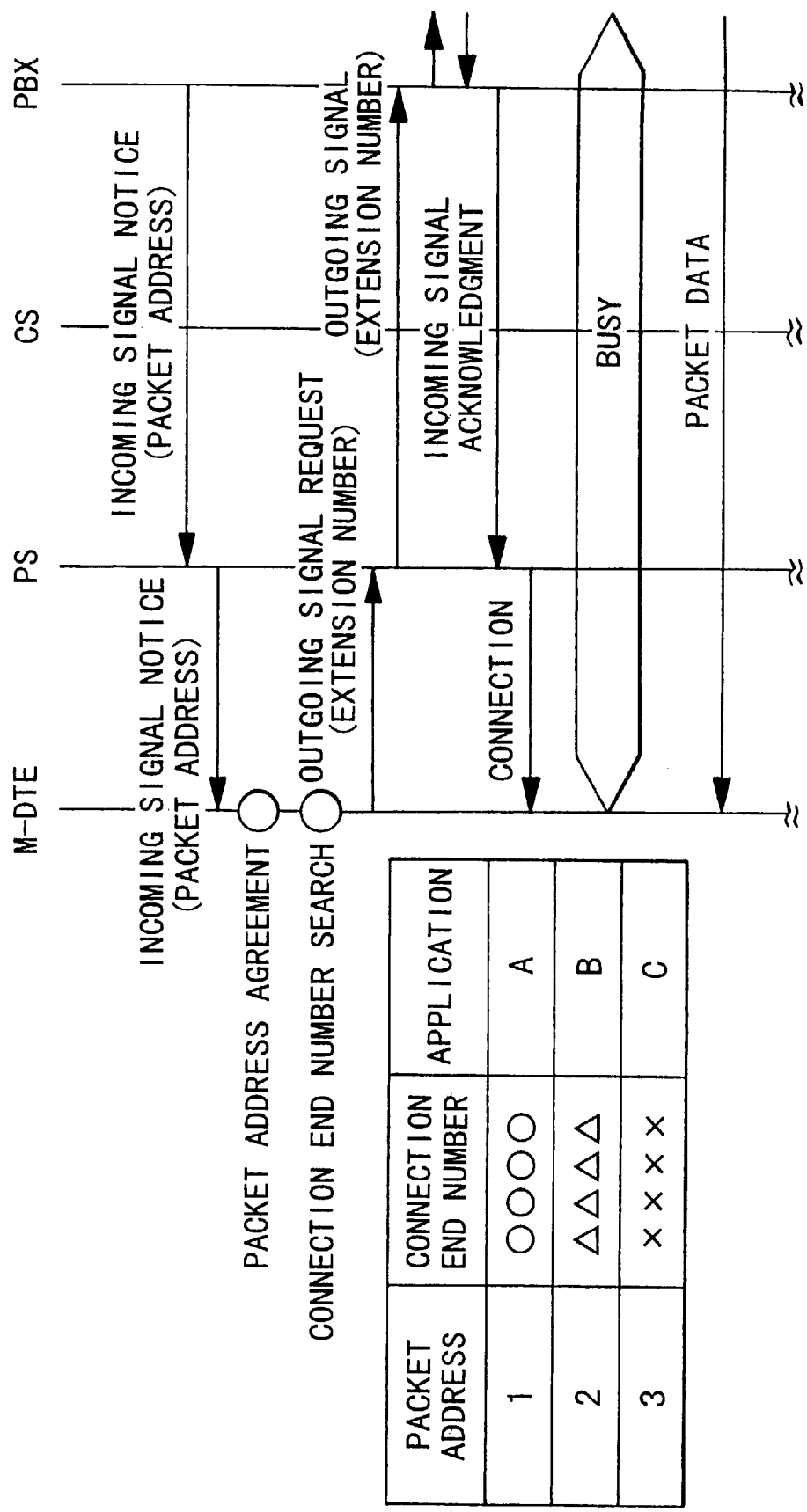
FIG. 7 is a connection sequence diagram showing an operation of a mobile radio data communication system according to the fifth embodiment of the present invention.

In this system, the PS stores therein the table exemplified in FIG. 7. Since the packet address 1 is included in the incoming signal notifying signal, the PS reads the connection end number 1 (telephone number of the control unit 1) corresponding to the packet address 1 from the table and makes a call for this connection end number 1 to the PS. At the same time, the PS notifies the M-DTE of the incoming signal. The M-DTE is established into a state capable of sending and receiving the packet data by the incoming signal notice from the PS. It should be noted that the M-DTE may be established into a state capable of sending and receiving the packet data when the first packet data are received. In the alternative, it may also preliminarily be established into a state capable of receiving the packet data.

The CS establishes a communication path between the PS and at the same time, sends an outgoing signal request for the connection end number 1 to the PBX. The PBX transmits an incoming signal to the connection end No. 1, i.e., control unit 1.

When receiving this incoming signal, the control unit 1 transmits an acknowledgment signal to the PBX. When receiving this acknowledgment signal, the PBX establishes a communication path between the PS. Here, the call signal from the PS includes the packet address 1 and this packet address 1 is transmitted to the control unit 1. Therefore, the control unit 1 can recognize the connection of the M-DTE having the packet address 1 by receiving this packet address 1. Then, the control unit 1 judges that the packet data can now be sent and received between the M-DTE and transmits the reserved packet data 1 to the M-DTE. Thereafter, a sending and receiving of the packet data are started between the M-DTE and the LAN 1.

As a method for the control unit 1 to recognize the M-DTE as a counterpart of connection, a method may be employed in which packet data are sent from the M-DTE to the control unit 1 after connection, and the control unit 1 recognizes the M-DTE from the sender's address included in this packet data.

<8: Sixth Embodiment>

In the above examples, the in-office PC system and the LAN are connected in the in-enterprise communication system.

However, the present invention should not be limited to those examples, and the in-office PC system can also be applied to a general mobile communications network (public PC network, radio call, cellular network, etc.)

Thus, the sixth embodiment is described next in which packet data are transmitted from the DTE under the control of the LAN side to a data communication terminal equipment through a PS under the control of a mobile communications network. This sixth embodiment transmits a signal from the CS to the PS as a message of a pager.

<8-1: Communication System>

Figure 8:
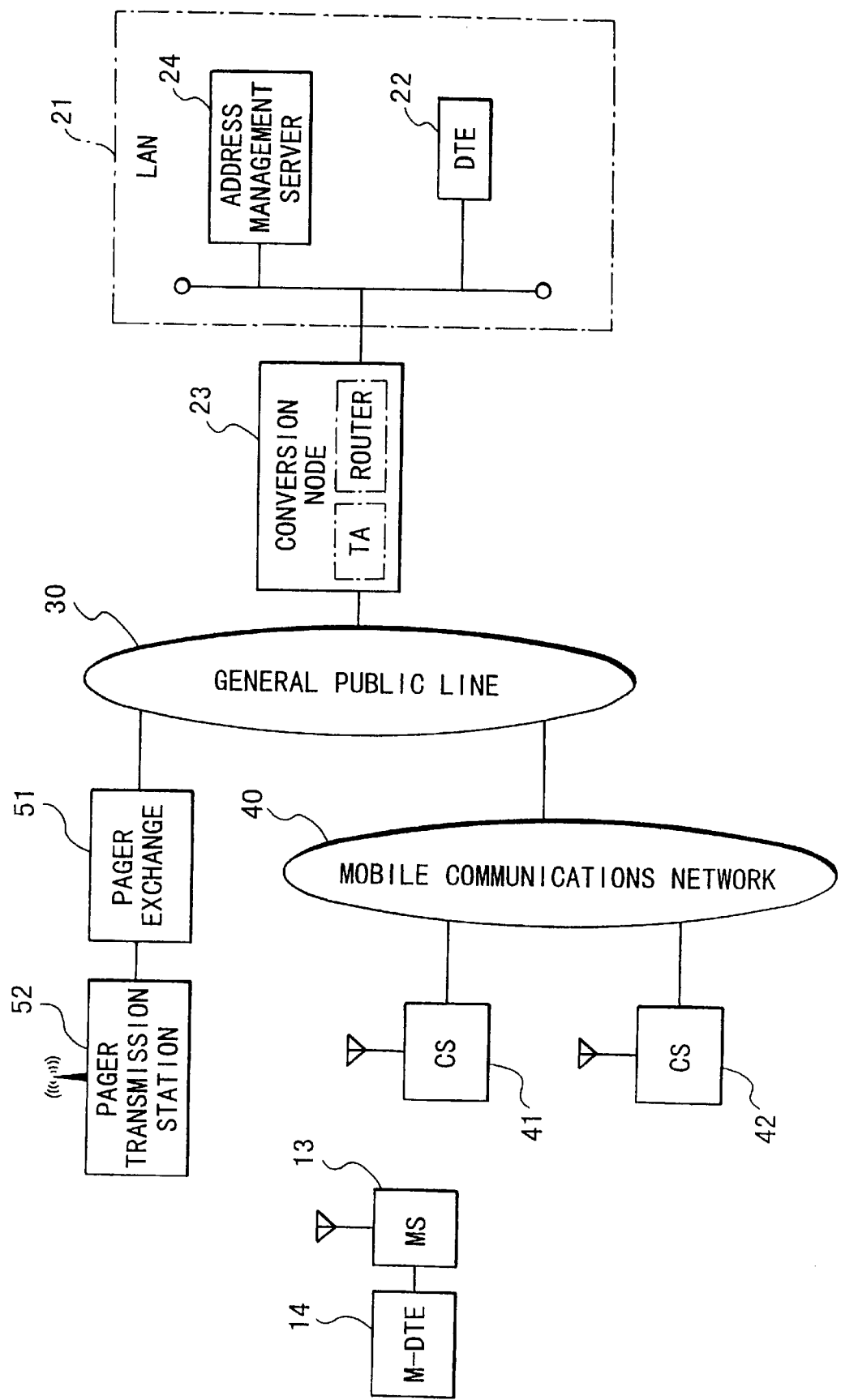
FIG. 8 is a diagram showing another example of a configuration of an in-company mobile radio data communication system applicable to the present invention.

FIG. 8 is a block diagram showing a configuration of a mobile radio data communication system to which the sixth embodiment is applied. In this Figure, portions common to FIG. 1 are denoted by identical reference numerals. In this embodiment, the protocol on the LAN 21 is explained as TCP/IP used in the Internet, etc. as in FIG. 1.

Of course, if the "IP address" under explanation is replaced by other corresponding routing address, this can also be applied to data communications network having other protocols.

As shown in the illustration, the LAN 21 is connected to a general public line 30 and a mobile communications network 40 through the control unit 23. The general public line 30 is connected with a pager exchange 51, and the pager exchange 51 is connected with a pager transmitting station 52. The existing one can be used for all of them. The mobile communications network 40 includes cell stations 41, 42, . . . which are wirelessly connected with mobile stations.

The mobile data terminal equipment (M-DTE) 14 is a data terminal such as portable computer, high performance PDA, etc. The M-DTE 14 is connected to a mobile station (hereinafter referred to as MS) 113. The MS 113 includes memory means such as flush memory, not shown, for storing therein an IP address assigned to the M-DTE and a telephone number of the control unit 23, and the like.

The MS 113 includes data sending/receiving means for sending and receiving data by sending an outgoing signal to the control unit 23 through the cell stations 41, 41, . . . , message receiving means for receiving a message coming from a pager transmitting station 52, and judgment means 23 for supplying the M-DTE 14 with a data message indicating that the IP address stored in the memory means is in accord, when such is the case, with the IP address included in the message received by the message receiving means, sending an outgoing signal to the control unit 23 through the data sending/receiving means, and transmitting the particular IP address to the control unit 23 after a communication path is established.

A method for realizing the data sending/receiving means and the message receiving means in the MS 113 will now briefly be described.

Recently, the communication path is increasingly digitized in the field of mobile communication, and a comparatively high speed transmission is realized, utilizing a digital mobile data communication system. There are several types of such digital mobile data communication system, such as PDC (Personal Digital Cellular), PHS (Personal Handyphone System), etc. As the MS, a terminal integrally formed of the PHS and pager is already available in the market. If those techniques are utilized, the MS 113 including the data sending/receiving means and the message receiving means can be realized. It should be noted that at least an existing service capable of message transmission by way of numerical figures can be utilized as paging service (pager exchange 51 and pager transmitting station 52).

On the other hand, the control unit 23 includes, as in FIG. 1, the router 23a and the TA 23b. Thus, the control unit 23 makes it possible to enjoy a remote access from outside to the LAN 21 through the mobile communications network 40, etc. Among them, the router 23a performs a routing of the packet data from the DTE 22 on the LAN side based on the IP address included in the particular packet data. The TA 23b terminates a serial line between the general public line 30, receives an incoming signal from the general public line 30, and sends an outgoing signal to the general public line 30.

The control unit 23 includes a memory unit such as RAM (Random Access Memory), hard disk, etc. The control unit 23 stores in the memory unit the IP address assigned to the M-DTE 14 by way of corresponding the particular IP address to group information (as later described) of the message receiving means in the MS 113. When the IP address included in the arrived packet data is in agreement with the one assigned to the M-DTE 14, the control unit 23 temporarily reserves the packet data sends an outgoing signal to the pager exchange 51 with a common pager number commonly established to the subscribers, via the general public line 30, so that the IP address to which the particular packet data are addressed, is transmitted by way of paging, via the general public line 30, pager exchange 51, and pager transmitting state 52.

Although, FIG. 8 does not show one corresponding to the PBX of FIG. 1, no inconvenience will occur because the general public line 30 usually has a plurality of exchanges for changing the line from one to another. Also, the mobile communications network 40 has an exchange for changing the line from one to another for the cell stations which are wirelessly connected to the MS 113. For this reason, in this embodiment, the role that the PBX of FIG. 1 has, is had by the exchanges of the general public one 30 and mobile communications network 40.

<8-2: Assignment and Registration Procedure of IP Address>

In the communication system having the above-mentioned configuration or architecture, it is necessary that an IP address is assigned to the M-DTE 14 by the address management server 24 in the LAN 21 before the M-DTE 14 is connected to the LAN 21. Also, it is necessary that this IP address is stored in the MS 113 and registered in the control unit 23. Thus, those procedures are described next.

The IP address, which has been paid out of the address management server 24 on the LAN 21 and assigned, is temporarily stored in the M-DTE and then, transmitted to and stored in memory means of the MS 113 by way of a predetermined sequential steps. For example, in case the M-DTE 14 and the MS 113 are physically separated, the IP address is transmitted through a PC card standard interface, etc. and stored in the memory means of the MS 113, although this sequential steps is not particularly limited.

Figure 9:
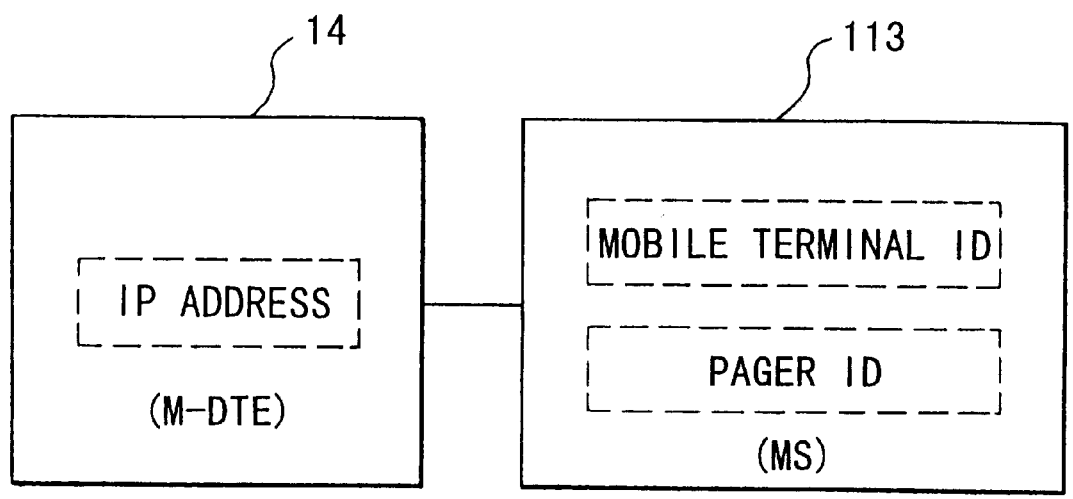
FIG. 9 is a block diagram showing function models of a personal station and a mobile data communication terminal device of FIG. 8.

FIG. 9 is a block diagram showing function models of the MS 113 and the M-DTE 114. As illustrated in this Figure, originally, the MS 113 reserves an ID as a pager (this ID is hereinafter referred to as "pager ID"), and an ID as a terminal for sending and receiving data through the cell stations 41, 42, . . . (this ID is hereinafter referred to as "terminal ID"). Those Ids are assigned to subscribers by respective service providers when the subscribers' application for services are accepted and become usable for various services when written into the internal memory means, for example. As previously mentioned, the IP address is stored in the memory means of the MS 113 together with those IDs.

Registration of the IP address can be made by any suitable conventional means, such as on-line procedure on a communication path established between the M-DTE 14 and the control unit 23, for example. As previously mentioned, the control unit 23 stores therein the IP address such that the IP address is in corresponding relation to the group information of the message receiving means of the MS 113.

The terms "group information" used here refer to information (for example, call number) indicating the group of the mobile terminal (message receiving means) for notifying via the pager exchange 51 and pager transmitting station 52.

If the number of mobile terminal equipment devices, which ask for a remote access to the LAN 21, is equal to or less than the number which can be accommodated in the same group, a group registration can be eliminated by grouping those mobile terminal equipment devices into the same group. It is also acceptable that a message solely composed of the IP address is sent to a certain group, and a message including the sender's information of the packet, as well as the IP address is notified to other group, so that the group information can be utilized for versatility and separation of services.

It should be noted here that the router portion 23a of the control unit 23 is not required to store therein the pager ID of the MS 113, ID of the terminal equipment devices, and telephone numbers. That is, the control unit 23 can well be unconscious of the physical address of the M-DTE 14.

<8-3: Packet Transmission Procedure From LAN 21 side To M-DTE 14>

Next, referring to FIG. 10, there is described a procedure for transmitting packet data when it occurs to transmit packet date addressed to the M-DTE 14 in the LAN 21. Presume that the IP address corresponding to the M-DTE is registered in the router 23a of the control unit 23 such that the IP address is in corresponding relation with the group information. It is also presumed that the MS 113 is in a position ready to received a message from the pager transmitting station 52.

Under the above circumstance, when packet data addressed to the registered IP address arrives, the router portion 23a of the control unit 23 performs a paging procedure via the TA 23b. The terms "paging procedure" used here refers to a procedure for sending same massages to a plurality of pagers which are registered as a group. The services for sending same massages to a plurality of pagers which are registered as a group, are services which general paging service facilities have. The services are put into practice when a message transmission is requested by indicating a call number for the group. Of course, it is presumed that a registration is preliminarily made such that the MS 113 belongs to a group which can be identified by a call number used in paging procedure by the control unit 23.

When the control unit 23 sends a signal to the pager exchange 51 with the call number for a particular group and requests a transmission of a message including the IP address addressed by the packet data which have just arrived (this packet data is hereinafter referred to as "arrived packet data"), this message is notified to each MS including the MS 113 which is registered as a group, through the pager exchange 51 and the pager transmitting station 52.

When the above message is received, the MS 113 refers to the content of the received message for comparison with the preliminarily registered IP address. If the result of the comparison reveals that the content of the received message is not in agreement with the preliminarily registered IP address, the MS 113 is brought back again into the position for waiting a further massage. In contrast, if the content of the received message is in agreement with the preliminarily registered IP address, an outgoing signal is sent to the control unit 23 via the nearest cell station (for example, cell station 41) and a communication path is established because the packet data addressed to the M-DTE 14 are supposedly arrived.

When the communication path is established, a signal as an acknowledgment of the packet data, including the received IP address (IP address stored in own memory) is sent back from the MS 113 to the router 23a of the control unit 23 and a receipt of the packet data is requested. The router 23a transmits the temporarily reserved arrived packet to the M-DTE 14 through the communication path. Thereafter, a two-way data communication is performed as in the ordinary remote access.

<8-4: Summary>

As explained hereinbefore, according to the sixth embodiment, the MS includes the message receiving means and the data sending/receiving means, and the control unit notifies all terminal equipment devices in the group of a message including the IP address addressed by the arrived packet data. Accordingly, each MS can know the existence of a packet arrival addressed to itself by comparing the IP address included in the received message and its own IP address. Thus, each MS can instantaneously respond to a call from the LAN side. As a consequence, a communication, in which an immediate response is expected as in the case with Internet phone, etc., can smoothly be realized.

Moreover, the MS stores therein the IP address. Accordingly, the MS can make a judgment whether or not an outgoing signal may be sent to the control unit by comparing the content of the arrived message with the IP addressed which the MS itself stores. If it is designed such that when the judgment result is affirmative, the MS itself turns the power source on automatically, power consumption can be reduced.

Furthermore, since paging services are used, there are such advantages that no facilities for relaying the packet data are required to be provided in the mobile communications network. Moreover, because the existing paging services can be used, a communication system can be built up easily without a need of extensive change of the existing system structure. Furthermore, since it is no more required such troublesome procedures as storing the telephone number to each MS in the control unit and obtaining a corresponding relationship between the IP address, a communication system can be built up easily without making the structure of the control unit complicated.

It should be appreciated that although, in the sixth embodiment, the MS itself compares the received IP address as in the second and fourth embodiments, this job may be undertaken by the M-DTE side as in the first and third embodiments.

Moreover, although an example is shown in the sixth embodiment in which a communication path is established using a mobile communications network, the communication path may be established merely through a fixed network. In that case, instead of the MS, a fixed terminal such as model, DSU (Digital Service Unit), etc. is connected to a data communication terminal equipment so that a communication path can be established through the fixed terminal. Of course, the fixed terminal is required to have the function of a pager.

<9: Modified Embodiment>

With respect to the first through sixth embodiments so far described, the following modifications and application can be contemplated.

In the first through sixth embodiments, although the notice of an arrived packet data and the content of the paging are served as the IP address addressed to the arrived packet, other data than the IP address may be included therein.

As data other than the IP address, firstly, a sender's address, kinds of application software of the sender, and the like can be listed. Upon receipt of such data, the radio mobile station side can selectively respond or not respond depending on the sender's address, or depending on presence or non-presence of a software which is compatible with the sender's application software. Of course, in this case, if the M-DTE as the addressee of the arrived packet is in a non-responding state, a procedure to be performed by the control unit must be preliminarily established.

Secondly, as data other than the IP address to included, there can be contemplated not only characters such as numerical figures, symbols, etc., but also video data, voice data, and the like.

Control channels used for transmitting a notice of an arrival and paging channels used for transmission of a message originally have a property capable of transmitting any kind of information. Therefore, the existing services can also be used for transmitting video data, voice data, etc. as a message. For this reason, only if an arrangement can be made such that the control unit side reads data located in a particular bit of the arrived packet and transmits the same to the radio mobile station, and that the PS, CS or M-DTE side offers such video image voice data, etc. indicated by the particular data, an application area of the present invention is widened. In actual practice, it should be arranged such that the kinds of data can reliably be identified, for example, by changing the channel to be used in accordance with the kind of data.

What is claimed is:

1. A method of packet data transmission in a mobile radio data communication system comprising a personal station, a mobile data terminal equipment to be connected to said personal station, a wireless connection equipment for performing a wireless connection with said personal station, an exchange for connecting said personal station and a counterpart thereof through said wireless connection equipment, a LAN, a data terminal equipment on the LAN side connected to said LAN, and a control unit for performing a transmission control of packet data in said LAN and a transmission control of packet data between said exchange and said LAN, characterized in that said mobile data terminal equipment is assigned a packet address to be used in said LAN, and said control unit preliminarily has stored therein a packet address corresponding to said mobile data terminal equipment;

when transmitting packet data to said mobile data terminal equipment, said LAN side data terminal equipment transmits packet data including a packet address of said mobile data terminal equipment to said LAN;

if the packet address included in the packet data received through said LAN is the packet address of said mobile data terminal equipment, said control unit reserves the packet data and requests said exchange to connect to the mobile data terminal equipment corresponding to the packet address;

when requested a connection to the mobile data terminal equipment corresponding to the packet address, said exchange establishes a communication path for said control unit and transmits a signal including the packet address to said personal station through said wireless connection equipment;

if the packet address included in said signal is a packet address corresponding to said mobile data terminal equipment, said personal station transmits an acknowledgement signal;

when receiving the acknowledgement signal through said wireless connection equipment, said exchange acknowledges the connection to said mobile data terminal equipment corresponding to the packet address to said control unit; and when receiving the acknowledgement from said exchange, said control unit transmits the reserved packet data to said mobile data terminal equipment.

2. A method of packet data transmission in a mobile radio data communication system according to claim 1, wherein when receiving a signal through said wireless connection equipment, said personal station transmits the packet address included in the signal to said mobile data terminal equipment;

when receiving the packet address, said mobile data terminal equipment judges whether or not the packet address is its own packet address and if the result of judgment is affirmative, requests said personal station to acknowledge an incoming signal; and when requested the acknowledgment of an incoming signal by said mobile data terminal equipment, said personal station transmits an acknowledge signal.

3. A method of packet data transmission in a mobile radio data communication system according to claim 1, wherein when receiving a signal through said wireless connection equipment, said personal station judges whether or not the packet address included in the signal is a packet address of said mobile data terminal equipment, and if the judgment result is affirmative, transmits an acknowledgment signal.

4. A method of packet data transmission in a mobile radio data communication system according to claim 1, wherein said personal station includes the packet address of said mobile data terminal equipment in the acknowledgement signal and transmitting the same; and when receiving the acknowledgement signal through said wireless connection equipment, said exchange judges whether or not the packet address included in the acknowledgement signal is the packet address included in the incoming signal acknowledgement and only when the result of judgment is affirmative, responds to said control unit for connection to the mobile data terminal equipment corresponding to the packet address.

5. A method of packet data transmission in a mobile radio data communication system according to claim 1, wherein a plurality of packet addresses are assigned to said mobile data terminal equipment, and when an incoming signal is received for any one of those packet addresses, a personal station connected to said mobile data terminal equipment is connected to a control unit which is predetermined with respect to the packet address.

6. A method of packet data transmission in a mobile radio data communication system according to claim 1, wherein said wireless connection equipment transmits a signal including the packet address to said personal station through said control channel used for connection control.

7. A method of packet data transmission in a mobile radio data communication system according to claim 1, wherein said wireless connection equipment transmits a signal containing the packet address to said personal station through a message channel for radio call.

8. A method of packet data transmission in a mobile radio data communication system comprising a personal station, a mobile data terminal equipment to be connected to said personal station, a wireless connection equipment for performing a wireless connection with said personal station, an exchange for connecting said personal station and a counterpart thereof through said wireless connection equipment, a LAN, a data terminal equipment on the LAN side connected to said LAN, and a control unit for performing a transmission control of packet data in said LAN and a transmission control of packet data between said exchange and said LAN, characterized in that said mobile data terminal equipment is assigned a packet address to be used in said LAN, and said control unit preliminarily has stored therein a packet address corresponding to said mobile data terminal equipment;

when transmitting packet data to said mobile data terminal equipment, said LAN side data terminal equipment transmits packet data including a packet address of said mobile data terminal equipment to said LAN;

if the packet address included in the packet data received through said LAN is the packet address of said mobile data terminal equipment, said control unit reserves the packet data and requests said exchange to notify of the incoming signal to the mobile data terminal equipment corresponding to the packet address;

when requested a notice of an incoming signal to the mobile data terminal equipment corresponding to the packet address, said exchange transmits a signal including the packet address to said personal station through said wireless connection equipment without establishing a communication path for said control unit;

if the packet address included in said signal is a packet address corresponding to said mobile data terminal equipment, said personal station transmits a call signal to said control unit;

said exchange transmits an incoming signal to said control unit in response to the call signal through said wireless connection equipment;

when receiving the incoming signal, said control unit transmits an acknowledgment signal to said exchange;

when receiving the acknowledgement, said exchange establishes a communication path between said control unit and said personal station; and said control unit transmits the reserved packet data to said mobile data terminal equipment through said communication path.

9. A method of packet data transmission in a mobile radio data communication system according to claim 8, wherein when receiving a signal through said wireless connection equipment, said personal station transmits the packet address included in the signal to said mobile data terminal equipment;

when receiving the packet address, said mobile data terminal equipment judges whether or not the packet is its own packet address and if the result of judgment is affirmative, requests said personal station of a call signal; and when requested of a call signal from said mobile data terminal equipment, said personal station transmits a call signal.

10. A method of packet data transmission in a mobile radio data communication system according to claim 8, wherein when receiving a signal through said wireless connection equipment, said personal station judges whether or not the packet address included in the signal is a packet address of said mobile data terminal equipment, and if the judgment result is affirmative, transmits a call signal.

11. A method of packet data transmission in a mobile radio data communication system according to claim 8, wherein a plurality of packet addresses are assigned to said mobile data terminal equipment, and when an incoming signal is received for any one of those packet addresses, a personal station connected to said mobile data terminal equipment is connected to a control unit which is predetermined with respect to the packet address.

12. A method of packet data transmission in a mobile radio data communication system according to claim 8, wherein said wireless connection equipment transmits a signal including the packet address to said personal station through said control channel used for connection control.

13. A method of packet data transmission in a mobile radio data communication system according to claim 8, wherein said wireless connection equipment transmits a signal containing the packet address to said personal station through a message channel for radio call.

\* \* \* \* \*